No. 791,290. PATENTED MAY 30, 1905.
A. R. ROBERTSON.
DEVICE FOR ATTACHING FISHING LINES TO FLOATS OR SINKERS.
APPLICATION FILED JULY 26, 1904.
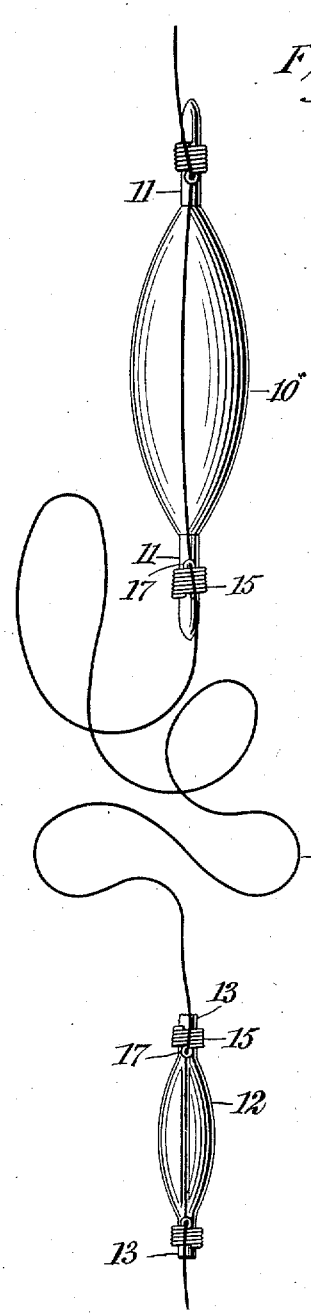
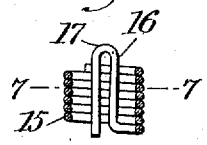
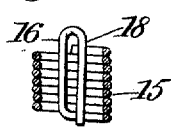
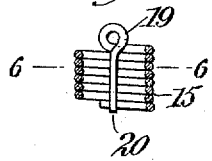
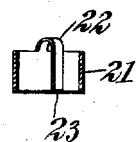
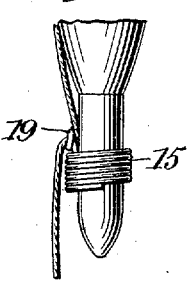
WITNESSES:
Edward Thorpe.
C. R. Ferguson
INVENTOR
Alexander R. Robertson
BY Munn & Co
ATTORNEYS No. 791,290. Patented May 30, 1905.

UNITED STATES PATENT OFFICE.

ALEXANDER ROTH ROBERTSON, OF PASS CHRISTIAN, MISSISSIPPI.

DEVICE FOR ATTACHING FISHING-LINES TO FLOATS OR SINKERS.

SPECIFICATION forming part of Letters Patent No. 791,290, dated May 30, 1905.

Application filed July 26, 1904. Serial No. 218,200.

*To all whom it may concern:*

Be it known that I, ALEXANDER ROTH ROB-ERTSON, a citizen of the United States, and a resident of Pass Christian, in the county of Harrison and State of Mississippi, have invented a new and Improved Device for Attaching Fish-Lines to Floats or Sinkers, of which the following is a full, clear, and exact description.

This invention relates to improvements in devices for attaching fishing-lines to floats and sinkers, the object being to provide an attaching device of simple construction and inexpensive, by means of which a line may be quickly attached to and securely held in contact with a float or sinker, but permitting the float to be adjusted as desired, and that may be readily detached without removing the hooks from the line or the line from a rod.

I will describe a device for attaching fish-lines to floats or sinkers embodying my invention and then point out the novel features in the appended claims.

Reference is to be had to the accompanying drawings, forming a part of this specification, in which similar characters of reference indicate corresponding parts in all the figures.

Figure 1 shows a sinker, a float, and a line with attaching devices embodying my invention. Fig. 2 is a longitudinal section of the attaching device shown in Fig. 1. Figs. 3, 4, and 5 are sectional views showing modifications. Fig. 6 is a section on the line 6 6 of Fig. 4. Fig. 7 is a section on the line 7 7 of Fig. 2. Fig. 8 is a cross-section showing another modification, and Fig. 9 illustrates the manner of clamping the line against the stem of a float or sinker.

Referring to the drawings, 10 designates a float having the usual stems 11 at its ends, and 12 indicates a sinker formed with stems 13 at its ends. The attaching device for securing the line 14 to the float or sinker consists, as shown in Figs. 1 and 2, of a band 15, formed of a length of wire turned into a coil. The end of the coil at one end of the band is extended through the band, as indicated at 16, and forms one member of a line-retaining device 17, and from this retaining device the other member thereof is extended through the band.

The construction shown in Fig. 3 is substantially the same as that shown in Fig. 2, excepting that the member 18 of the band at its end overlaps the coil from which the member 16 extends.

In Fig. 4 the upper coil of the band is turned to form a retaining device 19 at the end of the band, and from this device a portion 20 extends through the band to the opposite end.

In Fig. 5 a band 21 is formed of a solid strip of metal, and on one end a line-retaining device 22 is formed, the member 23 thereof being extended through the band. To receive the member 20 of the retaining device shown in Fig. 4, the band may be provided at one side with a recess or channel 24, as indicated in Fig. 6, and, as shown in Fig. 7, a wide channel 25 is formed to receive the two members of the retaining device indicated in Fig. 2.

In Fig. 8 the inwardly-extended member of the retaining device is wholly within the interior plane of the band, the same being indicated at 26.

In securing a line a loop is formed in the same and passed over the end of the free member of the retaining devices. Then the line is drawn up into the retaining devices and the band placed on the stem. The said retaining devices being resilient and turned slightly inward will force the line tightly against the stem, as indicated in Fig. 9. As a further means for securing the band from slipping the extended end of its line-retaining device may be slightly pressed into the stem. To remove the line from the float or sinker, the attaching device is to be slipped off and the line removed from the retaining device.

Having thus described my invention, I claim as new and desire to secure by Letters Patent—

1. A fish-line-attaching device comprising a band, and a line-retaining device formed at one end of the band, a continuation from said retaining device being extended within the band, the said retaining device being adapted to clamp the line against the part to which the line is to be secured.

2. A fish-line-attaching device comprising a band consisting of coiled wire, a part of one end coil thereof being extended through the band and formed into a line-retaining device at the opposite end.

3. A fish-line-attaching device consisting of a band formed of a coiled wire, the end of a coil at one end of the band being passed through the band and turned to form a line-retaining device, a member from said retaining device being passed through the band, the said band being provided with a longitudinal channel to receive the members passed through the band.

4. A fish-line-attaching device comprising a band formed of a single length of coiled wire, the end of one of the coils terminating in a line-retaining device at one end of the band and adapted to clamp the line against the part to which the line is to be secured.

In testimony whereof I have signed my name to this specification in the presence of two subscribing witnesses.

ALEXANDER ROTH ROBERTSON.

Witnesses:
ED BURKE,
ELMER NORTHROP.